United States Patent [19]

Knapik et al.

[11] 4,032,475

[45] June 28, 1977

[54] HYDROCARBON CONVERSION WITH A SELECTIVELY SULFIDED ACIDIC MULTIMETALLIC CATALYTIC COMPOSITE

[75] Inventors: H. Peter G. Knapik, Brookfield; Frank H. Adams, La Grange Park, both of Ill.

[73] Assignee: UOP Inc., Des Plaines, Ill.

[22] Filed: Dec. 8, 1975

[21] Appl. No.: 638,798

[52] U.S. Cl. .............................. 252/439; 252/441; 252/442; 208/139
[51] Int. Cl.² .......................................... B01J 27/04
[58] Field of Search .................. 252/439, 442, 441

[56] References Cited

UNITED STATES PATENTS

| | | |
|---|---|---|
| 2,500,146 | 3/1950 | Fleck et al. ................... 208/138 X |
| 3,109,038 | 10/1963 | Myers .............................. 208/139 X |
| 3,632,525 | 1/1972 | Rausch .............................. 252/442 |
| 3,660,309 | 5/1972 | Hayes et al. ........................ 252/442 |
| 3,960,710 | 6/1976 | Pollitzer et al. ............... 252/441 X |

*Primary Examiner*—Patrick P. Garvin
*Attorney, Agent, or Firm*—James R. Hoatson, Jr.; Thomas K. McBride; William H. Page, II

[57] ABSTRACT

Hydrocarbons are converted by contacting them at hydrocarbon conversion conditions with a selectively sulfided acidic multimetallic catalytic composite comprising a combination of catalytically effective amounts of a platinum group component, a tin component, a cobalt component, and a halogen component with a porous carrier material. The platinum group component, tin component, cobalt component, and halogen component are present in the multimetallic catalyst in amounts respectively, calculated on an elemental basis, corresponding to about 0.01 to about 2 wt. % platinum group metal, about 0.01 to about 5 wt. % tin, about 0.01 to about 5 wt. % cobalt, and about 0.1 to about 3.5 wt. % halogen. Moreover, these metallic components are relatively uniformly dispersed throughout the porous carrier material in carefully controlled oxidation states such that substantially all of the platinum group metal is present therein in the elemental metallic state, substantially all of the catalytically available cobalt component is present in a sulfided state, while substantially all of the tine is present therein in the form of tin oxide. A specific example of the type of hydrocarbon conversion process disclosed is a process for the catalytic reforming of a low-octane gasoline fraction wherein the gasoline fraction and a hydrogen stream are contacted with the selectively sulfided acidic multimetallic catalyst disclosed herein at reforming conditions.

12 Claims, No Drawings

HYDROCARBON CONVERSION WITH A SELECTIVELY SULFIDED ACIDIC MULTIMETALLIC CATALYTIC COMPOSITE

The subject of the present invention is a novel selectively sulfided acidic multimetallic catalytic composite which has exceptional activity, selectivity, and resistance to deactivation when employed in a hydrocarbon conversion process that requires a catalyst having both a hydrogenation-dehydrogenation function and a carbonium ion-forming function. More precisely, the present invention involves a novel dual-function selectively sulfided acidic multimetallic catalytic composite which, quite surprisingly, enables substantial improvements in hydrocarbon conversion processes that have traditionally used a dual-function catalyst. In another aspect, the present invention comprehends the improved processes that are produced by the use of a selectively sulfided catalytic composite comprising a combination of catalytically effective amounts of a platinum group metal component, a sulfided cobalt component, a tin oxide component, and a halogen component with a porous carrier material; specifically, an improved reforming process which utilizes the subject catalyst to improve activity, selectivity, and stability characteristics.

Composites having a hydrogenation-dehydrogenation function and a carbonium ion-forming function are widely used today as catalysts in many industries, such as the petroleum and petrochemical industry, to accelerate a wide spectrum of hydrocarbon conversion reactions. Generally, the carbonium ion-forming function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, hydrogenolysis, isomerization, dehydrogenation, hydrogenation, desulfurization, cyclization, polymerization, alkylation, cracking, hydroisomerization, dealkylation, transalkylation, etc. In many cases, the commercial applications of these catalysts are in processes where more than one of the reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking and hydrogenolysis of naphthenes and paraffins, and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is a hydroisomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents such as hydrogen; (2) selectivity refers to the amount of desired product or products obtained relative to the amount of reactants charged or converted; (3) stability refers to the rate of change with time of the activity and selectivity parameters — obviously, the smaller rate implying the more stable catalyst. In a reforming process, for example, activity commonly refers to the amount of conversion that takes place for a given charge stock at a specified severity level and is typically measured by octane number of the C-5 plus product stream; selectivity refers to the amount of C-5 plus yield, relative to the amount of the charge that is obtained at the particular activity or severity level; and stability is typically equated to the rate of change with time of activity, as measured by octane number of C-5 plus product, and of selectivity as measured by C-5 plus yield. Actually, the last statement is not strictly correct because generally a continuous reforming process is run to produce a constant octane C-5 plus product with severity level being continuously adjusted to attain this result; and furthermore, the severity level is for this process usually varied by adjusting the conversion temperature in the reaction so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which is a hydrogendeficient polymeric substance having properties akin to both polynuclear aromatics and graphite. This material coats the surface of the catalyst and thus reduces its activity by shielding its active sites from the reactants. In other words, the performance of this dual-function catalyst is sensitive to the presence of carbonaceous deposits or coke on the surface of the catalyst. Accordingly, the major problem facing workers in this area of the art is the development of more active and/or selective catalytic composites that are not as sensitive to the presence of these carbonacous materials and/or have the capability to suppress the rate of the formation of these carbonaceous materials on the catalyst. Viewed in terms of performance parameters, the problem is to develop a dual-function catalyst having superior activity, selectivity, and stability characteristics. In particular, for a reforming process, the problem is typically expressed in terms of shifting and stabilizing the C-5 plus yield-octane relationship at the lowest possible severity level — C-5 plus yield being representative of selectivity and octane being proportional to activity.

We have now found a dual-function selectively sulfided acidic multimetallic catalytic composite which possesses improved activity, selectivity, and stability characteristics when it is employed in a process for the conversion of hydrocarbons of the type which have heretofore utilized dual-function acidic catalytic composites such as processes for isomerization, hydroisomerization, dehydrogenation, desulfurization, denitrogenization, hydrogenation, alkylation, dealkylation, disproportionation, polymerization, hydrodealkylation, transalkylation, cyclization, dehydrocyclization, cracking, hydrocracking, halogenation, reforming, and the like processes. In particular, we have ascertained that a selectively sulfided acidic catylyst, comprising a combination of catalytically effective amounts of a platinum group metal component, a sulfided cobalt component, a tin oxide component, and a halogen component with a porous refractory carrier material, can enable the performance of hydrocarbon conversion processes utilizing dual-function catalysts to be substantially improved in the metallic components are relatively uniformly dispersed throughout the carrier material and if their oxidation states are controlled to be in the states hereinafter specified. Moreover, we have determined that a selectively sulfided acidic catalytic composite, comprising a combination of catalytically effective amounts of a platinum group metal component, a tin oxide component, a sulfided cobalt component, and a chloride component with an alumina carrier material, can be utilized to substantially improve the performance of a reforming process which operates on a low-octane gasoline fraction to produce a high-octane reformate if the metallic components are relatively uniformly dispersed throughout the alumina carrier material, if the catalyst is selectively sulfided so that substantially all of the sulfide is associated with the cobalt component and if the oxidation states of the other metallic components are fixed in the state hereinafter specified. In the case of a reforming process, major advantages associated with the use of the present invention involves: (1) the acquisition of the capability to operate in a stable manner (particularly in regard to C-5 plus yield) in a high severity operation; for example, a low or moderate pressure reforming process designed to produce a C-5 plus reformate having an octane of about 100 F-1 clear; (2) substantially increased selectivity for C-5 plus yield and hydrogen production relative to the performance of the prior art bimetallic platinum-tin catalyst system; and (3) increased tolerance for sulfur contaminants relative to the unsulfided platinum-tin-cobalt catalyst system. As indicated, the present invention essentially involves the finding that the addition of a combination of a tin oxide component and a sulfided cobalt component to a dual-function acidic hydrocarbon conversion catalyst containing a platinum group component can enable the performance characteristics of the catalyst to be sharply and materially improved, if the hereinafter specified limitations on amounts of ingredients, selective sulfiding of cobalt component, oxidation states of tin and platinum group metals, and distribution of metallic components in the support are met.

It is accordingly, one object of the present invention to provide a selectively sulfided acidic multimetallic hydrocarbon conversion catalyst having superior performance characteristics when utilized in a hydrocarbon conversion process. A second object is to provide a selectively sulfided acidic multimetallic catalyst having dual-function hydrocarbon conversion performance characteristics that are relatively insensitive to the deposition of hydrocarbonaceous material thereon and to the presence of sulfur contaminants in the reaction environment. A third object is to provide preferred methods of preparation of this selectively sulfided acidic multimetallic catalytic composite which ensures the achievement and maintenance of its properties. Another object is to provide an improved trimetallic reforming catalyst having superior activity, selectivity, and stability characteristics relative to the bimetallic catalyst systems of the prior art. Yet another object is to provide a selectively sulfided dual-function hydrocarbon conversion catalyst which utilizes a combination of a tin oxide component and a cobalt sulfide component to beneficially interact with and promote an acidic catalyst containing a platinum group component.

In brief summary, the present invention is, in one embodiment, a selectively sulfided acidic catalytic composite comprising a porous carrier material containing, on an elemental basis, about 0.01 to about 2 wt. % platinum group metal, about 0.01 to about 5 wt. % cobalt, about 0.01 to about 5 wt. % tin, and about 0.1 to about 3.5 wt. % halogen; wherein the platinum group metal, tin and catalytically available cobalt are uniformly dispsersed throughout the porous carrier material; wherein substantially all of the platinum group metal is present in the elemental metallic state; wherein substantially all of the catalytically available cobalt is present in a sulfided state; and wherein substantially all of the tin is present in the form of tin oxide.

A second embodiment relates to a selectively sulfided acidic catalytic composite comprising a porous carrier material containing, on an elemental basis, about 0.05 to about 1 wt. % platinum group metal, about 0.5 to about 2 wt. % cobalt, about 0.05 to about 1 wt. % tin, and about 0.5 to about 1.5 wt. % halogen; wherein the platinum group metal, tin, and catalytically available cobalt are uniformly dispersed throughout the porous carrier material; wherein substantially all of the platinum group metal is present in the corresponding elemental metallic state; wherein substantially all of the tin is present in the form of tin oxide and wherein substantially all of the catalytically available cobalt is present in a sufided state.

A third embodiment relates to the catalytic composite described in the first or second embodiment wherein the halogen is combined chloride.

Yet another embodiment involves a process for the conversion of a hydrocarbon comprising contacting the hydrocarbon and hydrogen with the catalytic composite described above in the first or second or third embodiment at hydrocarbon conversion conditions.

A preferred embodiment comprehends a process for reforming a gasoline fraction which comprises contacting the gasoline fraction and hydrogen with the catalytic composite described above in the first or second or third embodiment at reforming conditions selected to produce a high octane reformate.

A highly preferred emnbodiment is a process for reforming a gasoline fraction which comprises contacting the gasoline fraction and hydrogen in a substantially water-free environment with the selectively sulfided catalytic composite characterized in the first, second, or third embodiment at reforming conditions selected to produce a high octane reformate.

Other objects and embodiments of the present invention relate to additional details regarding preferred catalytic ingredients, preferred amounts of ingredients, suitable methods of composite preparation, operating conditions for use in the hydrocarbon conversion processes, and the like particulars, which are hereinafter given in the following detailed discussion of each of these facets of the present invention.

The selectively sulfided acidic multimetallic catalyst of the present invention comprises a porous carrier material or support having combined therewith catalytically effective amounts of a platinum group metal component, a sulfided cobalt component, a tin oxide component, and a halogen component.

Considering first the porous carrier material utilized in the present invention, it is preferred that the material be a porous, adsorptive, high-surface area support having a surface area of about 25 to about 500 sq.m./g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaoline, kieselguhr, etc.; (3) ceramics porcelain, crushed firebrick, bauxite; (4) refractory inorganic oxides such as alumina, titanium dioxide, zirconium, dioxide, chormium oxide, beryllium oxide, vanadium oxide, cesium oxide, hafnium oxide, zinc oxide, magnesia, boria, thoria, silica-alumina, silica-magnesia, chormia-alumina, alumia-boria, silica-zirconia, etc.; (5) crystalline zeolitic aluminosilicates such as naturally occurring or synthetically prepared mordenite and/or faujasite, either in the hydrogen form or in a form which has been treated with multivalent cations; (6) spinels such as $MgAl_2O_4$, $FeAl_2O_4$, $ZnAl_2O_4$, $MnAl_2O_4$, $CaAl_2O_4$, and other like compounds having the formula $MO.Al_2O_3$ where M is a metal having a valence of 2; and (7) combinations of elements from one or more of these groups. The preferred porous carrier materials for use in the present invention are refractory inorganic oxides, with best results obtained with an alumina carrier material. Suitable alumina materials are the crystalline aluminas known as gamma-, eta-, and theta-alumina, with gamma- or eta-alumina giving best results. In addition, in some embodiments, the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.3 to about 0.9 g/cc and surface area characteristics such that the average pore diameter is about 20 to 300 Angstroms, the pore volume is about 0.1 to about 1 cc/g and the surface area is about 100 to about 500 sq.m./g. In general, best results are typically obtained with a gamma-alumina carrier material which is used in the form of sperical particles having: a relatively small diameter (i.e. typically about 1/16-inch to 1/8-inch), an apparent bulk density of about 0.3 to about 0.8 g/cc, a pore volume of about 0.4 ml/g, and a surface area of about 150 to 225 sq.m./g.

The preferred alumina carrier material may be prepared in any suitable manner and may be synthetically prepared or naturally occurring. Whatever type of alumina is employed, it may be activated prior to use by one of more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, tablets, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the resultant hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

As used herein, the expression "catalytically available cobalt" is intended to mean the portion of the cobalt component that is available for use in accelerating the particular hydrocarbon conversion reaction of interest. For certain types of carrier materials which can be used in the preparation of the instant catalyst composite, it has been observed that a portion of the cobalt incorporated therein is essentially bound-up in the crystal structure thereof in a manner which essentially makes it more a part of the refractory carrier material than a catalytically active component. Specific examples of this effect are observed when the carrier material can form a spinel or spinel-like structure with a portion of the cobalt component. When this effect occurs, it is only with great difficulty that the portion of the cobalt bound-up with the support can be transformed to a catalytically active state and the conditions required to do this are beyond the severity levels normally associated with hydrocarbon conversion conditions and are in fact likely to seriously damage the necessary porous characteristics of the support. In the cases where cobalt can interact with the crystal structure of the support to render a portion thereof catalytically unavailable, the concept of the present invention merely requires that the amount of cobalt added to the subject catalyst be adjusted to satisfy the requirements of the support as well as the catalytically available cobalt requirements of the present invention. Against this background then, the hereinafter stated specifications for sulfide form and dispersion of the cobalt component are to be interpreted as directed to a description of the catalytically available cobalt. On the other hand, the specifications for the amount of cobalt used are to be interpreted to include all of the cobalt contained in the catalyst in any form.

One essential constituent of the acidic multimetallic catalyst of the present invention is a tin component. An essential feature of the present invention is that substantially all of the tin component is present in an instant catalytic composite in the form of tin oxide. The subsequently described oxidation, reduction and sulfiding steps that are preferably used in the preparation of the instant catalytic composite are specifically designed to achieve this tin oxide state for this component. The term "tin oxide" as used herein refers to a coordinated complex of at least oxygen and tin which are not necessarily present in the same relationship for all cases covered herein. This tin component can be used in any amount which is catalytically effective, with good results obtained, on an elemental basis, with about 0.01 to about 5 wt. % tin in the catalyst. Best results are ordinarily achieved with about 0.05 to about 1 wt. % tin, calculated on an elemental basis.

This tin component may be incorporated in the catalytic composite in any suitable manner known to the art to result in a relatively uniform dispersion of the tin moiety in the carrier material, such as by coprecipitation or cogellation with the porous carrier material, ion exchange with the gelled carrier material, or impregnation with the carrier material either after, before, or during the period when it is dried and calcined. It is to be noted that it is intended to include within the scope of the present invention all conventional methods for incorporating and simultaneously uniformly distributing a metallic component in a catalytic composite and the particular method of incorporation used is not deemed to be an essential feature of the present invention. One method of incorporating the tin component into the catalytic composite involves cogelling or coprecipitating the tin component in the form of the corresponding hydrous oxide during the preparation of the preferred carrier material, alumina. This method typically involves the addition of a suitable sol-soluble tin compound such as stannous chloride, stannic chloride, and the like to the alumina hydrosol and then combining the hydrosol with a suitable gelling agent and dropping the resulting mixture into an oil bath, etc., as explained in detail hereinbefore. Alternatively, the tin compound can be added to the gelling agent. After drying and calcining the resulting gelled carrier material in air, there is obtained an intimate combination of alumina and tin oxide. A preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound without adversely affecting the carrier material or the other ingredients of the catalyst — for example, a suitable alcohol, ether, acid and the like solvents. The solvent is preferably an aqueous, acidic solution. Thus, the tin component may be added to the carrier material by commingling the latter with an aqueous acidic solution of suitable tin salt, complex, or compound such as stannous bromide, stannous chloride, stannic chloride, stannic chloride pentahydrate, stannic chloride diammine, stannic trichloride bromide, stannic chlorate, stannous fluoride, stannic iodide, stannous sulfate, stannic tartrate and the like compounds. A particularly preferred impregnation solution comprises an acidic aqueous solution of stannic or stannous chloride. Suitable acids for use in the impregnation solution are; inorganic acids such as hydrochloric acid, nitric acid, and the like, and stongly acidic organic acids such as oxalic acid, malonic acid, citric acid, and the like. In general, the tin component can be impregnated either prior to, simultaneously with, or after the other ingredients are added to the carrier material. However, excellent results are obtained when the tin component is incorporated in the carrier material during its preparation and the platinum group and cobalt components are added in a subsequent impregnation after the tin-containing carrier material is calcined. When the tin component is added simultaneously with the other components, a preferred impregnation solution is an aqueous solution of chloroplatinic acid, hydrochloric acid, stannous or stannic chloride, and cobaltous chloride. The amount of hydrochloric acid used in this impregnation solution should be at least about 5 wt. % of the carrier material which is to be impregnated.

A second essential ingredient of the subject catalyst is the platinum group component. That is, it is intended to cover the use of platinum, iridium, ruthenium, rhodium, palladium, or mixtures thereof, as a second component of the present composite. It is an essential feature of the present invention that substantially all of this platinum group component exists within the final catalytic composite in the elemental metallic state. Generally, the amount of this component present in the final catalytic composite is small compared to the quantities of the other components combined therewith. In fact, the platinum group component generally will comprise about 0.01 to about 2 wt. % of the final catalytic composite, calculated on an elemental basis. Excellent results are obtained when the catalyst contains about 0.05 to about 1 wt. % of platinum, iridium, rhodium, or palladium metal. Particularly preferred mixtures of these metals are platinum and iridium, and platinum and rhodium.

This platinum group component may be incorporated in the catalytic composite in any suitable manner known to result in a relatively uniform distribution of this component in the carrier material such as coprecipitation or cogellation, ion exchange or impregnation. The preferred method of preparing the catalyst involves the utilization of a soluble, decomposable compound of platinum group metal to impregnate the carrier material in a relatively uniform manner. For example, this component may be added to the support by commingling the latter with an aqueous solution of chloroplatinic or chloroiridic or chloropalladic acid. Other water-soluble compounds or complexes of platinum group metals may be employed in impregnation solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, socium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic, or chloropalladic acid or rhodium trichloride hydrate, is preferred since it facilitates the incorporation of both the platinum group components and at least a minor quantity of the halogen component in a single step. Hydrogen chloride or the like acid is also generally added to the impregnation solution in order to further facilitate the incorporation of the halogen conponent and the uniform distribution of the metallic components throughout the carrier material. In addition, it is generally preferred to impregnate the carrier material after it has been calcined in order to minimize the risk of washing away the valueable platinum or palladium compounds; however, in some cases, it may be advantageous to impregnate the carrier material when it is in a gelled state.

A third essential ingredient of the acidic multimetallic catalytic composite of the present invention is a cobalt component. Although this component may be initially incorporated into the subject composite in many different decomposable forms which are hereinafter stated, our basic finding is that a highly beneficial and catalytically active state for this component in a process for hydrocarbon conversion with the instant catalyst is the sulfided state. Consequently, it is a feature of our invention that substantaiily all of the catalytically available cobalt component exists in the final catalytic composite in a sulfided state. The subsequently described oxidation, reduction and selective sulfiding steps which are performed in the preparation of the instant catalyst are specifically designed to ensure that this sulfided cobalt state for this component is achieved. As a corollary to this basic finding on the benefits associated with the state of the catalytically available cobalt component, it follows that the presence of the catalytically available cobalt in forms which are not sulfidable at conventional sulfiding conditions is to be scrupulously avoided if the full benefits of the present invention are to be realized. Illustrative of these undesired forms are cobalt oxide and the cobalt oxysulfur compounds such as cobalt sulfate. Best results are obtained when the composite, prior to the selective sulfiding of same, contains all of the catalytically available cobalt component in the elemental metallic state, thereby facilitating the rapid and complete conversion of same to the desired sulfided cobalt form in the subsequently described sulfiding step. All available evidence indicates that the preferred preparation procedure specifically descirbed in Example I results in a catalyst having the catalytically available cobalt component in a sulfided state. The cobalt component may be utilized in the composite in any amount which is catalytically effective, with the preferred amount being about 0.1 to about 5 wt. % thereof, calculated on an elemental cobalt basis. Typically, best results are obtained with about 0.5 to about 2 wt. % cobalt. It is, additionally, preferred to select the specific amount of cobalt from within this broad weight range as a function of the amount of the platinum group component, on an atomic basis, as is explained hereinafter.

Th cobalt component may be incorporated into the catalytic composite in any suitable manner known to those skilled in the catalyst formulation art to result in a relatively uniform distribution of the catalytically available cobalt in the carrier material such as coprecipitation, cogellation, ion exchange, impregnation, etc. In addition, it may be added at any stage of the preparation of the composite — either during preparation of the carrier material or thereafter — since the precise method of incorporation used is not deemed to be critical. However, best results are obtained when the catalytically available cobalt component is relatively uniformly distributed throughout the carrier material in a relatively small particle or crystallite size having a maximum dimension of less than 100 Angstroms, and the preferred procedures are the ones that are known to result in a composite having a relatively unform distribution of the catalytically available cobalt moiety in a relatively small particle size. One acceptable procedure for incorporating this component into the composite involves cogelling or coprecipitating the cobalt component during the preparation of the preferred carrier material, alumina. This procedure usually comprehends the addition of a soluble, decomposable, and reducible compound of cobalt such as cobalt chloride or nitrate to the alumina hydrosol before it is gelled. Alternatively, the reducible compound of cobalt can be added to the gelling agent before it is added to the hydrosol. The resulting mixture is then finished by conventional gelling, aging, drying, and calcination steps as explained hereinbefore. One preferred way of incorporating this component is an impregnation step wherein the porous carrier material is impregnated with a suitable cobalt-containing solution either before, during, or after the carrier material is calcined or oxidized. The solvent used to form the impregnation solution may be water, alcohol, ether, or any other suitable organic or inorganic solvent provided the solvent does not adversely interact with any of the other ingredients of the composite or interfere with the distribution, reduction, and sulfiding of the cobalt component. Preferred impregnation solutions are aqueous solutions of water-soluble, decomposable, and reducible cobalt compounds such as cobaltous acetate, cobaltous benzoate, cobaltous bromate, cobaltous bromide, cobaltous chlorate and perchlorate, cobaltous choride, cobaltic chloride, cobaltous fluoride, cobaltous iodide, cobaltous nitrate, hexamminecobalt (III) chloride, hexamminecobalt (III) nitrate, triethylenediamminecobalt (III) chloride, cobaltous hexamethylenetetramine, and the like compounds. Best results are ordinarily obtained when the impregnation solution is an aqueous solution of cobalt chloride or cobalt nitrate. This cobalt component can be added to the carrier material, either prior to, simultaneously with, or after the other metallic components are combined therewith. Best results are usually achieved when this component is added simultaneously with the platinum group component via an acidic aqueous impregnation solution. In fact, excellent results are obtained, as reported in the examples, with an impregnation procedure using an acidic aqueous impregnation solution comprising chloroplatinic acid, cobaltous chloride, and hydrochloric acid.

It is essential to incorporate a halogen component into the selectively sulfided acidic multimetallic catalytic composite of the present invention. Although the precise form of the chemistry of the association of the halogen component with the carrier material is not entirely known, it is customary in the art to refer to the halogen component as being combined with the carrier material, or with the other ingredients of the catalyst in the form of the halide (e.g. as the chloride). This combined halogen may be either fluorine, chlorine, iodine, bromine, or mixtures thereof. Of these, fluorine and, particularly, chlorine are preferred for the purposes of the present invention. The halogen may be added to the carrier material in any suitable manner, either during preparation of the support or before or after the addition of the other components. For example, the halogen may be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, may be combined with the carrier material during the impregnation of the latter with the platinum group, cobalt, or tin components; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5%, and preferably about 0.5 to about 1.5%, by weight of halogen, calculated on an elemental basis. In isomerization or hydrocracking embodiments, it is generally preferred to utilize relatively larger amounts of halogen in the catalyst — typically, ranging up to about 10 wt. % halogen calculated on an elemental basis, and more preferably, about 1 to about 5 wt. %. It is to be understood that the specified level of halogen component in the instant catalyst can be achieved or maintained during use in the conversion of hydrocarbons by continuously or periodically adding to the reaction zone a decomposable halogen-containing compound such as an organic chloride (e.g. ethylene dichloride, carbon tetrachloride, t-butyl chloride) in an amount of about 1 to 100 wt. ppm. of the hydrocarbon feed, and preferably, about 1 to 10 wt. ppm.

Regarding especially preferred amounts of the various metallic components of the subject catalyst, we have found it to be a good practice to specify the amounts of the cobalt component and the tin component as a function of the amount of the platinum group component. On this basis, the amount of the cobalt component is ordinarily selected so that the atomic ratio of cobalt to platinum group metal contained in the composite is about 0.8:1 to about 66:1, with the preferred range being about 1.6:1 to about 18:1. Similarly, the amount of the tin component is ordinarily selected to produce a composite containing an atomic ratio of cadmium to platinum group metal of about 0.1:1 to about 13:1, with the preferred range being about 0.3:1 to about 5:1.

Another significant parameter for the instant catalyst is the "total metals content" which is defined to be the sum of the platinum group component, the cobalt component, and the tin component, calculated on an elemental basis. Good results are ordinarily obtained with the subject catalyst when this parameter is fixed at a value of about 0.15 to about 6 wt. %, with best results ordinarily achieved at a metals loading of about 0.3 to about 5 wt. %.

In embodiments of the present invention wherein the instant selectively sulfided multimetallic catalytic composite is used for the dehydrogenation of dehydrogenatable hydrocarbons or for the hydrogenation of hydrogenatable hydrocarbons, it is ordinarily a preferred practice to include an alkali or alkaline earth metal component in the composite in an amount sufficient to make the resulting catalytic composite nonacidic and to minimize or eliminate the halogen component. More precisely, this optional ingredient is selected from the group consisting of the compounds of the alkali metals — cesium, rubidium, potassium, sodium, and lithium — and the compounds of the alkaline earth metals — calcium, strontium, barium, and magnesium. Generally, good results are obtained in these embodiments when this component constitutes about 0.1 to about 5 wt. % of the composite, calculated on an elemental basis. This optional alkali or alkaline earth metal component can be incorporated in the composite in any of the known ways, with impregnation with an aqueous solution of a suitable water-soluble, decomposable compound being preferred.

An optional ingredient for the selectively sulfided multimetallic catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith — for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. % of the carrier material generally being preferred.

Regardless of the details of how the components of the catalyst are combined with the porous carrier material, the final catalyst generally will be dried at a temperature of about 200° F to about 600° F. for a period of at least 2 to about 24 hours or more, and finally calcined or oxidized at a temperature of about 700° F to about 1100° F. in an air or oxygen atmosphere for a period of about 0.5 to about 10 hours in order to convert substantially all of the metallic components to the corresponding oxide form. Because a halogen component is utilized in the catalyst, best results are generally obtained when the halogen content of the catalyst is adjusted during the oxidation step by including a halogen or a halogen-containing compound such as HCl or an HCl-producing substance in the air or oxygen atmosphere utilized. In particular, when the halogen component of the catalyst is chlorine, it is preferred to use a mole ratio of water to HCl of about 5:1 to about 100:1 during at least a portion of the oxidation step in order to adjust the final chlorine content of the catalyst to a range of about 0.1 to about 3.5 wt. %. Preferably, the duration of this halogenation step is about 1 to 5 hours.

The resultant oxidized catalytic composite is preferably subjected to a substantially water-free reduction step prior to its use in the conversion of hydrocarbons. This step is designed to selectively reduce substantially all of the platinum group component and at least a portion of the catalytically available cobalt component to the elemental metallic state and to ensure a relatively uniform and finely divided dispersion of the metallic components throughout the carrier material, while preferably maintaining substantially all of the tin component in the form of tin oxide. Preferably substantially dry hydrogen (i.e. less than 20 vol. ppm. water) is used as the reducing agent in this step. The reducing agent is contacted with the oxidized catalyst at conditions including a reduction temperature of about 600° F to about 1200° F. and a period of time of about 0.5 to 10 hours effective to reduce at least a portion of he catalytically available cobalt component and substantially all of the platinum group component to the elemental metallic state while maintaining substantially all of the tin component in the form of tin oxide. If the hydrogen stream used in this reduction step contains more than trace amounts of hydrocarbons, we have observed that the reduction of the catalytically available cobalt component is facilitated. This reduction step, or a part thereof, can therefore be performed in situ as part of a start-up procedure for a hydrocarbon conversion process using the subject catalyst if the proper precautions are taken to predry the plant to a substantially water-free state and if a substantially water-free, hydrogen-containing reduction gas stream is employed. Sine we have found that selective sulfiding of the instant catalyst is greatly facilitated if substantially all of the catalytically available cobalt component is reduced to the elemental metallic state in this reduction step, it is a highly preferred practice to choose the reduction conditions from the ranges previously stated so that this end is achieved.

A key feature of the present invention involves a selective sulfiding procedure whereby substantially all of the catalytically available cobalt contained in the instant catalyst is converted to a sulfided state while substantially all of the platinum group component is maintained in the elemental metallic state and substantially all of the tin component is maintained in a tin oxide state. This selective sulfiding step is preferably performed on the catalyst resulting from the reduction step; particularly, when conditions used therein have been selected so that substantially all of the catalytically available cobalt contained therein at the start of this step is in the form of elemental metallic cobalt. In some cases, it may be possible to perform this sulfiding step on the oxidized catalytic composite directly with simultaneous or subsequent selective reduction of the platinum group component; however, such a sequence of steps is definitely not preferred. This selective sulfiding step can be performed in a number of different ways depending upon the particular circumstances. In one mode, it can be performed prior to use of the instant catalyst in the conversion of hydrocarbons by selectively sulfiding the reduced catalyst obtained from the reduction step. In another mode, it can be performed during start-up of the process by adding a sulfiding reagent to the reactor containing the reduced catalyst. And in still another mode of operation, it can be peformed at any time after the process using the catalyst hereinbefore described is started-up and linedout at hydrocarbon conversion conditions. In all cases, this selective sulfiding procedure preferably involves the following common elements: (1) a suitable sulfurcontaining decomposable sulfiding reagent which does not contain oxygen and and which is capable of coverting a metal to a metallic sulfide when contacted with same under sulfiding conditions; (2) sulfiding conditions including a temperature of about 50° F. to about 1100° F. (preferably about 650° F to 1050° F.), a contact time of about 0.1 to about 100 hours (preferably about 0.5 to 50 hours), and a pressure sufficient to provide reasonably good contact between the catalyst to be sulfided and the sulfiding reagent; and (3) an amount of sulfur incorporated in the catalyst which is sufficient to convert substantially all of the catalytically available cobalt component to a sulfided state — generally, this involves an amount which is substantially less than the stoichiometric amount for formation of cobalt sulfide from all the cobalt contained in the catalyst and which is typically siffficient to incorporate into the composite about 0.001 to about 1 wt. % sulfur, more preferably about 0.005 to 0.5 wt. % sulfur. It is to be noted that a critical feature of the present sulfiding procedure involves carefully adjusting the amount of sulfur present in the subject catalyst so that substantially all of it is associated with the cobalt component and none with the platinum group component. We have ascertained that this last objective is preferably achieved in one of two ways. First, since cobalt has a much stronger affinity for sulfur than a platinum group metal, sulfided cobalt will not decompose to any significant extent under conditions at which a platinum group sulfide will fully decompose; therefore, the desired state can be achieved by adding sulfide in an amount in excess of the amount necessary to form the desired cobalt-sulfur combination and thereafter removing the excess by a suitable platinum group sulfide decomposition step as by subjecting the supersulfided catalyst to a stripping operation with sulfur-free hydrogen at a temperature of about 700° F to 1100° F. until no further evolution of hydrogen sulfide is detected. The second way involves recognition that the principal reaction catalyzed by elemental metallic cobalt in a process for converting hydrocarbons with same is hydrogenolysis of hydrocarbons to make methane; therefore, the amount of sulfur to be added can be determined by starting-up a hydrocarbon conversion process with the unsulfided catalyst and monitoring the production of methane (either per se or as manifested in the hydrogen purity of the recycle gas) as the sulfiding reagent is added to the reaction zone in relatively small amounts. The correct amount of sulfur in the catalyst is then achieved just at the point where methane production is no longer responsive to further sulfur addition; that is, when it has dropped to a relatively low line-out value. In any case, the sulfiding reagent used is preferably selected from the following materials: hydrogen sulfide; aliphatic mercaptans such as ethyl mercaptan, propyl mercaptan, t-butyl mercaptan, ethylene bimercaptan; aromatic mercaptans such as thiophenol and derivatives; naphthenic mercaptans; aliphatic sulfides; aliphatic disulfides; aliphatic dithioacids; aliphatic-thioaldehydes and thioketones; and the like sulfur-containing compounds. The preferred sulfiding reagent is hydrogen sulfide. It is to be understood that once the sulfided cobalt state is achieved in the subject catalyst, it only is decomposed with great difficulty; nevertheless, it is within the scope of the present invention to continuously or periodically add a very small amount of sulfur to the sulfur to the reaction zone containing the instant selectively sulfided catalyst in order to maintain the desired sulfided cobalt state — normally, this involves the addition of the sulfiding reagent in an amount sufficient to provide about 0.1 to 1 wt. ppm. of sulfur in the hydrocarbon charge stock and, preferably, about 0.5 wt. ppm. In the mode of operation where the sulfiding step is conducted while the hydrocarbon conversion process using the subject catalyst is being started-up or has been operating for a time, the sulfiding reagent can be added to the charge stock, the hydrogen stream charged to the process, both of these, or added independently to the reaction.

According to the present invention, a hydrocarbon charge stock and hydrogen are contacted with the instant selectively sulfided acidic multimetallic catalyst in a hydrocarbon conversion zone. This contacting may be accomplished by using the catalyst in a fixed bed system, a moving bed system, a fluidized bed system, or in a batch type operation, however, in view of the danger of attrition losses of the valuable catalyst and of well known operational advantages, it is preferred to use either a fixed bed system or a dense-phase moving bed system such as is shown in U.S. Pat. No. 3,725,249. It is also contemplated that the contacting step can be performed in the presence of a physical mixture of particles of the catalyst of the present invention and particles of a conventional dual-function catalyst of the prior art. In a fixed bed system, a hydrogen-rich gas and the charge stock are preheated by any suitable heating means to the desired reaction temperature and then are passed into a conversion zone containing a fixed bed of the selectively sulfided acidic multimetallic catalyst. It is, of course, understood that the conversion zone may be one or more separate reactors with suitable means therebetween to ensure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where th selectively sulfided acidic multimetallic catalyst of the present invention is used in a reforming operation, the reforming system will typically comprise a reforming zone containing one or more fixed beds or dense-phase moving beds of the catalysts. In a multiple bed system, it is, of course, within the scope of the present invention to use the present catalyst in less than all of the beds with a conventional dual-function catalyst being used in the remainder of the beds. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines synthetic gasolines, partially reformed gasolines, and the like. On the other hand, it is frequently advantageous to charge thermally of catalytically cracked gasolines or higher boiling fractions thereof. Mixtures of straight run and cracked gasolines can also be used to advantage. The gasoline charge stock may be a full boiling gasoline having an initial boiling point of from about 50° to about 150° F. and an end boiling point within the range of from about 325° to about 425° F., or may be a selected fraction thereof which generally will be a higher boiling fraction commonly referred to as a heavy naphtha — for example, a naphtha boiling in the range of C-7 to 400° F. In some cases, it is also advantageous to charge pure hydrocarbons or mixtures of hydrocarbons that have been extracted from hydrocarbon distillates — for example, straightchain paraffins — which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment, the charge stock can be a paraffinic stock rich in C-4 to C-8 normal paraffins, or a normal butane-rich stock, or an n-hexane-rich stock, or a mixture of xylene isomers, or an olefin-containing stock, etc. In a dehydrogenation embodiment, the charge stock can be any of the known dehydrogenatable hydrocarbons such as an aliphatic compound containing 2 to 30 carbon atoms per molecule, a C-4 to C-30 normal paraffin, a C-8 to C-12 alkylaromatic, a naphthene, and the like. In hydrocracking embodiments, the charge stock will be typically a gas oil, heavy cracked cycle oil, etc. In addition, alkylaromatics, olefins, and naphthenes can be conveniently isomerized by using the catalyst of the present invention. Likewise, pure hydrocarbons or substantially pure hydrocarbons can be converted to more valuable products by using the acidic multimetallic catalyst of the present invention in any of the hydrocarbon conversion processes, known to the art, that use a dual-function catalyst.

In a reforming embodiment, it is generally preferred to utilize the novel selectively sulfided acidic multimetallic catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 20 ppm. and preferably less than 5 ppm. expressed as weight of equivalent water in the charge stock. In general, this can be accomplished by careful control of the water present in the charge stock and in the hydrogen stream. The charge stock can be dried by using any suitable drying means known to the art, such as a conventional solid adsorbent having a high selectivity for water, for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. In an especially preferred mode of operation, the charge stock is dried to a level corresponding to less than 5 wt. ppm. of water equivalent. In general, it is preferred to maintain the hydrogen stream entering the hydrocarbon conversion zone at a level of about 10 vol. ppm. of water or less and most preferably about 5 vol. ppm. or less. If the water level in the hydrogen stream is too high, drying of same can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25° to 150° F., wherein a hydrogen-rich gas stream is separated from a high octane liquid product stream, commonly called an unstabilized reformate. When the water level in the hydrogen stream is outside the range previously specified, at least a portion of this hydrogen-rich gas stream is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration, thereby controlling front-end volatility of the resulting reformate.

The operating conditions utilized in the numerous hydrocarbon conversion embodiments of the present invention are in general those customarily used in the art for the particular reaction, or combination of reactions, that is to be effected. For instance, alkylaromatic, olefin, and paraffin isomerization conditions include: a temperature of about 32° to about 1000° F. and preferably from about 75° to about 600° F., a pressure of atmospheric to about 100 atmospheres, a hydrogen to hydrocarbon mole ratio of about 0.5:1 to about 20:1, and an LHSV (calculated on the basis of equivalent liquid volume of the charge stock contacted with the catalyst per hour divided by the volume of conversion zone containing catalyst and expressed in units of hr.$^{-1}$) of about 0.2 to 10. Dehydrogenation conditions include: a temperature of about 700° to about 1250° F., a pressure of about 0.1 to about 10 atmospheres, a liquid hourly space velocity of about 1 to 40, and a hydrogen to hydrocarbon mole ratio of about 1:1 to 20:1. Likewise, typical hydrocracking conditions include: a pressure of about 500 psig. to about 3000 psig., a temperature of about 400° to about 900° F., an LHSV of about 0.1 to about 10, and hydrogen circulation rates of about 1000 to 10,000 SCF per barrel of charge.

In the reforming embodiment of the present invention, the pressure utilized is selected from the range of about 0 psig. to about 1000 psig., with the preferred pressure being about 50 psig. to about 600 psig. Particularly good results are obtained at low or moderate pressure; namely, a pressure of about 100 to 450 psig. In fact, it is a singular advantage of the present invention that it allows stable operation at lower pressure than have heretofore been successfully utilized in so-called "continuous" reforming systems (i.e. reforming for periods of about 15 to about 200 or more barrels of charge per pound of catalyst without regeneration) with all platinum monometallic catalyst. In other words, the selectively sulfided acidic multimetallic catalyst of the present invention allowed the operation of a continuous reforming system to be conducted at lower pressure (i.e. 100 to about 350 psig) for about the same or better catalyst cycle life before regeneration as has been heretofore realized with conventional monometallic catalysts at higher pressure (i.e. 400 to 600 psig). On the other hand, the extraordinary activity and activity-stability characteristics of the catalyst of the present invention relative to a conventional monometallic catalyst enables reforming conditions conducted at pressures of 400 to 600 psig. to achieve substantially increased catalyst cycle life before regeneration.

The temperature required for reforming with the instant catalyst is markedly lower than that required for a similar reforming operation using a high quality mono- or bi-metallic catalyst of the prior art. This significant and desirable feature of the present invenion is a consequence of the superior activity of the selectively sulfided acidic multimetallic catalyst of the present invention for the octane-upgrading reactions that are preferably induced in a typical reforming operation. Hence, the present invention requires a temperature in the range of from about 800° to about 1100° F. and preferably about 900° to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that not only is the initial temperature requirement lower, but also the rate for the instant catalyst at which the temperature is increased in order to maintain a constant octane product is at least as good as if not better than for an equivalent operation with a high quality bi-metallic reforming catalyst which is manufactured in exactly the same manner as the catalyst of the present invention except for the inclusion of the sulfided cobalt component. Moreover, for the catalyst of the present invention, the initial C-5 plus yield and the C-5 plus yield stability are substantially better than for this high quality bi-metallic reforming catalyst of the prior art. The superior activity, selectivity and stability characteristics of the instant catalyst can be utilized in a number of highly beneficial ways to enable increased performance of a catalytic reforming process relative to that obtained in a similar operation with a monometallic or bi-metallic catalyst of the prior art, some of these are: (1) Octane number of C-5 plus product can be increased without sacrificing C-5 plus yield and/or catalyst run length. (2) The duration of the process operation (i.e. catalyst run length or cycle life) before regeneration becomes necessary can be increased. (3) C-5 plus yield can be further increased by lowering average reactor pressure with no change in catalyst run length. (4) Investment costs can be lowered without any sacrifice in cycle life or in C-5 plus yield by lowering recycle gas requirements thereby saving on capital cost for compressor capacity or by lowering initial catalyst loading requirements thereby saving on cost of catalyst and on capital cost of the reactors. (5) Throughput can be increased significantly at no sacrifice in catalyst cycle life or in C-5 plus yield if sufficient heater capacity is available.

The reforming embodiment of the present invention also typically utilizes sufficient hydrogen to provide an amount of about 1 to about 20 moles of hydrogen per mole of hydrocarbon entering the reforming zone, with excellent results being obtained when about 2 to about 6 moles of hydrogen are used per mole of hydrocarbon. Likewise, the liquid hourly space velocity (LHSV) used in reforming is selected from the range of about 0.1 to about 10, with a value in the range of about 1 to about 5 being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory or at greatly increased throughput level with the same catalyst inventory than that heretofore used with conventional reforming catalyst at no sacrifice in catalyst life before regeneration.

The following examples are given to illustrate further the preparation of the selectively sulfided acidic multimetallic catalytic composite of the present invention and the use thereof in the conversion of hydrocarbons. It is understood that the examples are intended to be illustrative rather than restrictive.

EXAMPLE I

A tin-containing alumina carrier material comprising 1/16-inch spheres was prepared by: forming an aluminum hydroxyl chloride sol by dissolving substantially pure aluminum pellets in a hydrochloric acid solution, mixing stannic chloride with the resulting sol in an amount selected to result in a finished catalyst containing about 0.2 wt. % tin, adding hexamethylenetetramine to the resulting tin-containing alumina sol, gelling the resulting solution by dropping it into an oil bath to form spherical particles of an aluminum- and tin-containing hydrogel, aging and washing the resulting particles, and finally drying and calcining the aged and washed particles to form spherical particles of gamma-alumina containing a uniform dispersion of 0.2 wt. % tin in the form of tin oxide and about 0.3 wt. % combined chloride. Additional details as to this method of preparing the preferred gamma-alumina carrier material are given in the teachings of U.S. Pat. No. 2,620,314.

An aqueous acidic impregnation solution containing chloroplatinic acid, cobaltous chloride, and hydrogen chloride was then prepared. The tin-containing gamma-alumina carrier material was thereafter admixed with the impregnation solution. The amounts of the reagents contained in this impregnation solution was calculated to result in a final composite containing, on an elemental basis, 0.30 wt. % platinum, and 1.0 wt. % cobalt. In order to ensure uniform dispersion of the metallic components throughout the carrier material, the amount of hydrochloric acid used was about 3 wt. % of the alumina particles. This impregnation step was performed by adding the carrier material particles to the impregnation mixture with constant agitation. In addition, the volume of the solution was approximately the same as the void volume of the carrier material particles. The impregnation mixture was maintained in contact with the carrier material particles for a period of about ½ to about 3 hours at a temperature of about 70° F. Thereafter, the temperature of the impregnation mixture was raised to about 225° F. and the excess solution was evaporated in a period of about 1 hour. The resulting dried impregnated particles were then subjected to an oxidation treatment in a dry and sulfur-free air stream at a temperature of about 975° F. and a GHSV of about 500 for about ½ hour. This oxidation step was designed to convert substantially all of the metallic ingredients to the corresponding oxide forms. The resulting oxidized spheres were subsequently contacted in a halogen-treating step with a sulfur-free air stream containing water and HCl in a mole ratio of about 30:1 for about 2 hours at 975° F. and a GHSV of about 500 in order to adjust the halogen content of the catalyst particles to a value of about 1.02 wt. %. The halogen-treated spheres were thereafter subjected to a second oxidation step with a dry and sulfur-free air stream at 975° F. and a GHSV of 500 for an additional period of about ½ hour.

The oxidized and halogen-treated catalyst particles were then subjected to a dry prereduction treatment, designed to reduce substantially all of the platinum component and all of the catalyticaly active cobalt component to the elemental state while maintaining the tin component in a positive oxidation state, by contacting them for about 1 hour with a substantially hydrocarbon-free and sulfur-free dry hydrogen stream containing less than 5 vol. ppm. water at a temperature of about 1050° F., a pressure slightly above atmospheric, and a flow rate of the hydrogen stream through the catalyst articles corresponding to a gas hourly space velocity of about 400.

At the completion of the prereduction step, the resulting reduced catalyst was contacted with a dry gas stream containing a sulfiding reagent (i.e. hydrogen sulfide) and hydrogen in a selective sulfiding step designed to convert substantially all of the catalytically available cobalt component and at least a portion of the platinum component to the corresponding sulfide state. The amount of sulfiding reagent contained in this gas stream was about 1.3 mol. % thereof. The sulfiding conditions employed were: a temperature of 1050° F., atmospheric pressure, a space velocity of about 1800, and a treatment time of about 30 minutes.

The resulting supersulfided catalust was thereafter subjected to a stripping operation with a substantially pure hydrogen stream at conditions selected to decompose platinum sulfide, without affecting the sulfided cobalt component. The stripping conditions utilized were: a temperature of 1050° F., atmospheric pressure, a space velocity of about 1800, and a treatment time which continued until hydrogen sulfide was no longer detectable in the effluent gas stream from the zone containing the catalyst.

A sample of the resulting catalyst was analyzed and found to contain, on an elemental basis, 0.30 wt. % platinum, 0.2 wt. % tin, 1.0 wt. % cobalt, 1.02 wt. % chloride and 0.019 wt. % sulfur. The resulting catalyst is hereinafter referred to as Catalyst A.

EXAMPLE II

Example I was repeated except that the amount of cobalt reagent added to the impregnation solution is increased by a factor of four. The resuting catalyst (called hereinafter Catalyst B) was analyzed and found to contain, on an elemental basis, 0.30 wt. % platinum, 0.2 wt. % tin, 4.0 wt. % cobalt, 1.10 wt. % chloride and 0.75 wt. % sulfur.

EXAMPLE III

In order to compare the selectively sulfided acidic multimetallic catalytic composites of the present invention with a platinum-tin bi-metallic catalytic composite of the prior art in a manner calculated to bring out the beneficial interaction of a cobalt sulfide component on a platinum- and tin-containing acidic catalyst, a comparison test was made between the selectively sulfided acidic multimetallic catalysts of the present invention which were prepared in Examples I and II (i.e. catalysts A and B) and a control catalyst, which was a bi-metallic reforming catalyst of the prior art. The control catalyst (hereinafter designated catalyst C1) was a combination of a platinum component, a tin component, and a chloride component with a gamma-alumina carrier material in amounts sufficient to result in the final catalyst containing about 0.375 wt. % platinum, about 0.3 wt. % tin, and about 1 wt. % chloride. Catalyst C1 was prepared by a method analogous to that set forth in Example I except that no cobalt was added thereto in the impregnation step and that no selective presulfiding step was performed.

These catalysts were then separately subjected to a high stress accelerated catalytic reforming evaluation test designed to determine in a relatively short period of time their relative activity, selectivity, and stability characteristics in a process for reforming a relatively low-octane gasoline fraction. In all tests, the same charge stock ws utilized and its pertinent characteristics are set forth in Table I. It is to be noted that all runs were performed with high surface area sodium feed and recycle gas dryers so that the amount of water present in the total feed to the reactor for all runs was less than about 1 wt. ppm.

This accelerated reforming test was specifically designed to determine in a very short period of time whether the catalyst being evaluated has superior characteristics for use in a high severity reforming operation.

TABLE I

| Analysis of Charge Stock | |
|---|---|
| Gravity, API at 60° F. | 59.4 |
| Distillation Profile, ° F. | |
| Initial Boiling Point | 192 |
| 5% Boiling Point | 216 |
| 10% Boiling Point | 224 |
| 30% Boiling Point | 244 |
| 50% Boiling Point | 270 |
| 70% Boiling Point | 296 |
| 90% Boiling Point | 324 |
| 95% Boiling Point | 336 |
| End Boiling Point | 368 |
| Chloride, wt. ppm. | 0.2 |
| Nitrogen, wt. ppm. | 0.1 |
| Sulfur, wt. ppm. | 0.1 |
| Water, wt. ppm. | 35 |
| Octane Number, F-1 clear | 32.5 |
| Paraffins, vol. % | 68.9 |
| Naphthenes, vol. % | 22.4 |
| Aromatics, vol. % | 8.7 |

Each run consisted of a series of evaluation periods of 24 hours, each of these periods comprised a 12-hour line-out period followed by a 12-hour test period during which the C-5 plus product reformate from the plant was collected and analyzed. All test runs were performed at identical conditions which comprised a liquid hourly space velocity (LHSV) of 3.0, a pressure of 300 psig., a 10:1 gas to oil ratio, and an inlet reactor temperature which was continuously adjusted throughout the test in order to achieve and maintain a C-5 plus target octane of 100 F-1 clear.

All test runs were performed in a pilot plant scale reforming unit comprising a reactor containing a fixed bed of the catalyst undergoing evaluation, a hydrogen separation zone, a debutanizer column, and suitable heating means, pumping means, condensing means, compressing means, and the like conventional equipment. The flow scheme utilized in this plant involves commingling a hydrogen recycle stream with the charge stock and heating the resulting mixture to the desired conversion temperature. The heating mixture is then passed downflow into a reactor containing the catalyst undergoing evaluation as a stationary bed. An effluent stream is then withdrawn from the bottom of the reactor, cooled to about 55° F. and passed to a gas-liquid separation zone wherein a hydrogen-rich gaseous phase separates from a liquid hydrocarbon phase. A portion of the gaseous phase is then continuously passed through a high surface area sodium scrubber and the resulting substantially water-free and sulfur-free hydrogen stream is returned to the reactor in order to supply the hydrogen recycle stream. The excess gaseous phase from the separation zone is recovered as the hydrogen-containing product stream (commonly called "excess recycle gas"). The liquid phase from the separation zone is withdrawn therefrom and passed to a debutanizer column wherein light ends (i.e. C-1 to C-4) are taken overhead as debutanizer gas and C-5 plus reformate stream recovered as the principal bottom product.

The results of the separate tests performed on the selectively sulfided catalyst of the present invention, catalysts A and B, and the control catalyst, catalyst C1, are presented for each test period in Table II in terms of inlet temperature to the reactor in ° F. necessary to achieve the target octane level, the amount of C-5 plus reformate recovered expressed as liquid vol. % (LV%) of the charge stock, and hydrogen purity of excess recycle gas in mol. %.

Referring now the results of the comparison test presented in Table II, it is evident that the principal effect of the proper use of a sulfided cobalt component on a platinum-tin catalyst is to selectively promote same and to enable catalysts A and B to substantially outperform control catalyst C1 in the areas of relative platinum activity, selectivity for C-5 plus yield and hydrogen and selectivity-stability. That is, the data presented in Table II clearly indicates that both of the selectively sulfided acidic multimetallic catalysts of the present invention are superior to the unsulfided control catalyst in a high severity reforming process. As was pointed out in detail hereinbefore, when all other conditions are the same, a good measure of activity for a reforming catalyst is the inlet temperature to the reactor which is required to make target octane and the data presented in Table II on this variable clearly shows that catalysts A and B were as active as control catalyst C1. When proper allowance is made for this fact that control catalyst C1 contained 25% more platinum than catalysts A and B, it can be concluded that on a relative platinum content basis, catalysts A and B were significantly more active than control catalyst C1. Thus, the data clearly shows that both of the composites of the present invention were more active than the control catalyst on a relative platinum content basis. However, activity is only one of the necessary attributes needed in order for a catalyst to demonstrate superiority. Good activity characteristics must be coupled with superior selectivity and stability characteristics in order to demonstrate improved performance. Selectivity is measured directly by C-5 plus yield and hydrogen purity of the excess recycle gas and the data presented in Table II clearly indicates that catalysts A and B consistently produced yields and hydrogen purities which were significantly better than those for the plus yield immediately increased by an increment of about 3 LV% and stabilized at this higher value for the remainder of the run. Also recycle gas hydrogen purity increased by an increment of about 25 mol. % and also stabilized at this higher value for the duration of the test. These beneficial results were accompanied by an activity loss of about 25° F. for the selectively sulfided catalyst relative to the unsulfided catalyst; however, one of ordinary skill in the art will no doubt recognize

TABLE II

Results of Accelerated Reforming Test

| Period | CATALYST A | | | CATALYST B | | | CATALYST C1 | | |
|---|---|---|---|---|---|---|---|---|---|
| | T,° F. | $C_5+$,LV% | $\%H_2$ | T,° F. | $C_5+$,LV% | $\%H_2$ | T,° F. | $C_5+$,LV% | $\%H_2$ |
| 1 | 995.5 | 70.97 | 74.33 | 986.0 | 72.17 | 75.83 | 994.0 | 71.12 | 73.28 |
| 2 | 999.5 | 71.26 | 74.90 | 989.5 | 71.48 | 74.51 | 998.5 | 72.23 | 72.76 |
| 3 | 998.5 | — | — | 992.0 | — | — | 997.0 | — | — |
| 4 | 997.5 | 71.87 | 76.18 | 994.0 | 71.09 | 73.92 | 998.0 | 69.91 | 69.96 |
| 5 | 1000.0 | — | — | 997.5 | — | — | 999.5 | — | — |
| 6 | 1001.5 | 71.86 | 75.11 | 998.5 | 70.87 | 73.84 | 999.5 | 69.38 | 68.97 |
| 7 | 1003.0 | — | — | 1001.5 | — | — | 1001.5 | — | — |
| 8 | 1008.0 | 70.80 | 73.49 | 1001.5 | 70.34 | 72.64 | 1003.5 | — | — |
| 9 | 1009.5 | — | — | 1003.5 | — | — | 1006.0 | — | — |
| 10 | 1010.0 | — | — | — | — | — | 1010.5 | 67.75 | 64.83 |
| 11 | 1012.0 | — | — | — | — | — | — | — | — |
| 12 | 1015.0 | 69.79 | 70.59 | — | — | — | — | — | — | control catalyst. (It is to be noted that the dashes in Table II represent periods where the relevant analyses of the product streams were not made). On the other hand, good stability characteristics are shown by the rate of change of the activity and selectivity parameters as was explained hereinbefore, and on this basis the incremental changes in temperature required to maintain octane, in C-5 plus yield, and in hydrogen purity exhibited in Table II clearly shows excellent stability for the catalysts of the present invention relative to the performances of the control catalyst.

EXAMPLE IV

In order to study the mode of operation of the present invention where the selective sulfiding of the subject catalyst is performed during start-up of a hydrocarbon conversion process, an unsulfided catalyst containing 0.325 wt. % platinum, 1.0 wt. % cobalt, 0.2 wt. % tin and 1.0 wt. % chloride uniformly dispersed in a gamma-alumina base was prepared by a method analogous to that depicted in Example I except the selective sulfiding and hydrogen stripping steps were omitted. The resulting unsulfided catalyst was divided into two separate samples an separately tested in a catalytically reforming pilot plant having a flow scheme identical to the one hereinbefore described. In both cases, the conditions used and the charge stock were the same. The charge stock is characterized in Table I. The conditions used were: a pressure of 225 psig., a 1.3 LHSV, an 8.4:1 gas to oil ratio and a target octane number of 94 F-1 clear.

The only difference between the runs was that in the first run, t-butyl disulfide was added to the charge stock at a rate of 5.0 wt. ppm. during start-up of the run until hydrogen purity of the excess recycle gas (this is a sensitive indicator of suppression of methane production) stopped increasing and stabilized. This required 30 hours of sulfur addition and resulted in the selective sulfiding of the cobalt component of the catalyst to a level corresponding to about 0.023 wt. % sulfur in the total catalyst. The record run was, on the other hand, run without this selective sulfiding step during start-up.

The relative effect of this selective sulfiding procedure was quite pronouncedj and significant in that C-5 that this loss of activity is but a small price to pay for these dramatic selectivity benefits.

In summary, it is clear from the data presented in these examples that a sulfided cobalt component provides an efficient, selective and effective promoter for a platinum- and tin-containing acidic reforming catalyst in a high-severity reforming operation.

It is intended to cover by the following claims, all changes and modifications of the above disclosure of the present invention which would be self-evident to a man of ordinary skill in the hydrocarbon conversion art or the catalyst formulation art.

We claim as our invention:

1. A selectively sulfided acidic catalytic composite comprising a halogenated porous carrier material containing, on an elemental basis, about 0.01 to about 2 wt. % platinum group metal, about 0.1 to about 5 wt. % cobalt, about 0.01 to about 5 wt. % tin and about 0.1 to about 3.5 wt. % halogen; wherein the platinum group metal, catalytically available cobalt, and tin are uniformly dispersed throughout the porous carrier material; wherein substantially all of the platinum group metal is present in the elemental metallic state; wherein substantially all of the tin is present in the form of tin oxide; and wherein substantially all of the catalytically available cobalt is present in a sulfided state.

2. A catalytic composite as defined in claim 1 wherein the platinum group metal is platinum.

3. A catalytic composite as defined in claim 1 wherein the platinum group metal is iridium.

4. A catalytic composite as defined in claim 1 wherein the platinum group metal is rhodium.

5. A catalytic composite as defined in claim 1 wherein the platinum group metal is palladium.

6. A catalytic composite as defined in claim 1 wherein the porous carrier material is a refractory inorganic oxide.

7. A catalytic composite as defined in claim 6 wherein the refractory inorganic oxide is alumina.

8. A catalytic composite as defined in claim 1 wherein the halogen is chlorine.

9. A catalytic composite as defined in claim 1 wherein the catalytic composite is selectively sulfided, after substantially all of the platinum group metal and the catalytically available cobalt contained therein are reduced to the elemental metallic state, by contacting same with a sulfiding reagent in an amount and under conditions selected to convert substantially all of the catalytically available cobalt to the sulfide state while maintaining substantially all of the platinum group metal in the elemental state.

10. A catalytic composite as defined in claim 1 wherein the composite is prepared by the steps of:
 a. forming a composite comprising a combination of the specified amounts of platinum group metal, cobalt, tin and halogen with a porour carrier material wherein substantially all of the platinum group metal, cobalt and tin components are present in the corresponding oxide forms;
 b. reducing the resulting oxidized composition under conditions effective to reduce substantially all of the platinum group components and catalytically available cobalt to the corresponding elemental metallic states, while maintaining the tin component in an oxide state;
 c. sulfiding the resulting reduced composite by contacting same with a sulfiding reagent in an amount and under conditions at least sufficient to convert substantially all of the catalytically available cobalt and at least a portion of the platinum group component to the corresponding sulfide states; and thereafter,
 d. stripping substantially all of the sulfide from the platinum group component of the sulfided catalytic composite resulting from step (c), while maintaining substantially all of the catalytically available cobalt in a sulfided state.

11. A catalytic composite as defined in claim 1 wherein the catalytic composite is sulfided during start-up of a hydrocarbon conversion process by adding a sulfiding reagent to the reaction zone in an amount and under sulfiding conditions selected to convert substantially all of the catalytically available cobalt to the corresponding sulfided state while maintaining substantially all of the platinum group metal in an elemental state.

12. A catalytic composite as defined in claim 1 wherein the composite contains about 0.05 to about 1 wt. % platinum group metal, about 0.5 to about 2 wt. % cobalt, about 0.05 to about 1 wt. % tin and about 0.5 to about 1.5 wt. % halogen.

* * * * *